(12) United States Patent
Mellor et al.

(10) Patent No.: US 12,321,360 B2
(45) Date of Patent: Jun. 3, 2025

(54) SYSTEMS AND METHODS FOR DATA SHARING AND PROCESSING

(71) Applicant: NBCUniversal Media, LLC, New York, NY (US)

(72) Inventors: David Mellor, Lynnfield, MA (US); Joshua Michel, Malden, MA (US); Derek Co, Clifton, NJ (US)

(73) Assignee: NBCUniversal Media, LLC, New York, NY (US)

( * ) Notice: Subject to any disclaimer, the term of this patent is extended or adjusted under 35 U.S.C. 154(b) by 328 days.

(21) Appl. No.: 17/976,401

(22) Filed: Oct. 28, 2022

(65) Prior Publication Data

US 2023/0136709 A1    May 4, 2023

Related U.S. Application Data

(60) Provisional application No. 63/273,451, filed on Oct. 29, 2021.

(51) Int. Cl.
*G06F 16/25* (2019.01)
*G06F 21/62* (2013.01)

(52) U.S. Cl.
CPC ........ *G06F 16/254* (2019.01); *G06F 21/6245* (2013.01)

(58) Field of Classification Search
CPC .......................... G06F 16/254; G06F 21/6245
See application file for complete search history.

(56) References Cited

U.S. PATENT DOCUMENTS

| | | | | |
|---|---|---|---|---|
| 10,404,757 | B1* | 9/2019 | Horton | H04L 67/02 |
| 10,552,642 | B2* | 2/2020 | Rolle | G06F 21/6209 |
| 12,066,982 | B2* | 8/2024 | Greehy | G06F 16/176 |
| 2022/0164465 | A1* | 5/2022 | Prettejohn | G06F 21/6218 |
| 2023/0069247 | A1* | 3/2023 | Kucherov | G06F 16/955 |

* cited by examiner

*Primary Examiner* — Kris E Mackes
(74) *Attorney, Agent, or Firm* — Fletcher Yoder, P.C.

(57) ABSTRACT

A non-transitory computer readable medium includes instructions that, when executed by one or more processors, cause the one or more processors to receive, from a requesting account, a selection of one or more data sets that are indicated as sharable and requestor information. The instructions, when executed, also cause the one or more processors to generate a sharing request for the one or more data sets, validate the sharing request based on restrictions for the one or more data sets, apply requestor-specific restrictions to a subset of the one or more data sets to generate a modified subset of the one or more data sets, and send the modified subset of the one or more data sets to the requesting account.

16 Claims, 13 Drawing Sheets

SYSTEMS AND METHODS FOR DATA SHARING AND PROCESSING

CROSS-REFERENCE TO RELATED APPLICATIONS

This application claims priority to and the benefit of U.S. Provisional Application No. 63/273,451, entitled "SYSTEMS AND METHODS FOR DATA SHARING AND PROCESSING" and filed Oct. 29, 2021, which is incorporated by reference herein in its entirety for all purposes.

BACKGROUND

The present disclosure relates generally to methods for data sharing and data processing. More specifically, the present disclosure relates to efficient methods of securely sharing data internally within an organization and/or externally outside the organization.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Companies generally collect large amounts of data related to internal company activities and external data relating to partner organizations and customers of the company. Companies may have multiple business units across the company and may need to share collected data across the business units. Third-party cloud services may be used by the organizations to store company data, but the services may have different systems and regulations that apply to various types of data sharing. Many current data sharing methods may include multiple data sharing steps that may lead to delays in data sharing internally and externally to other organizations and may lead to large amounts of data duplication. As the amount of data collected by companies increases, the need for efficient data sharing methods that facilitate sharing of data with internal and external partners of an organization without creating large amounts of data duplication and/or data exposure are needed.

BRIEF DESCRIPTION

The data sharing and processing methods disclosed within enable in place data sharing across an enterprise by storing and processing raw data using a single data source, and providing the data for sharing from the same single data source. The owner of the data may control what rate the data is exposed, how the data is exposed, and what restrictions to impose on the data in regard to data sharing from the single central data source. This method of in place data sharing enables owner control over the data being shared in a centralized manner. Additionally, the in place data sharing removes data duplication from the data sharing process and reduces data sharing processing costs. This is because entire sets of raw data do not need to be copied when the data is shared from the single data source. The in place data sharing also enables updated data to be shared, since the data will be retrieved from the updated original data source.

Additionally, the owner of the data may impose restrictions on the base data that is shared with one or more data requesting accounts. The owner of the data may then enable the requesting account to access the base data according to the restrictions imposed on the base data. The restrictions may include restricting access to certain customer information and/or certain fields of data depending on the level of access associated with the requesting account. The data requesting account may include identification and/or credentials that are associated with a level of access to the data. The data requesting account may then access the central data source storing the base data, and access the data corresponding to the level of access determined for the base data.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Figure 1:
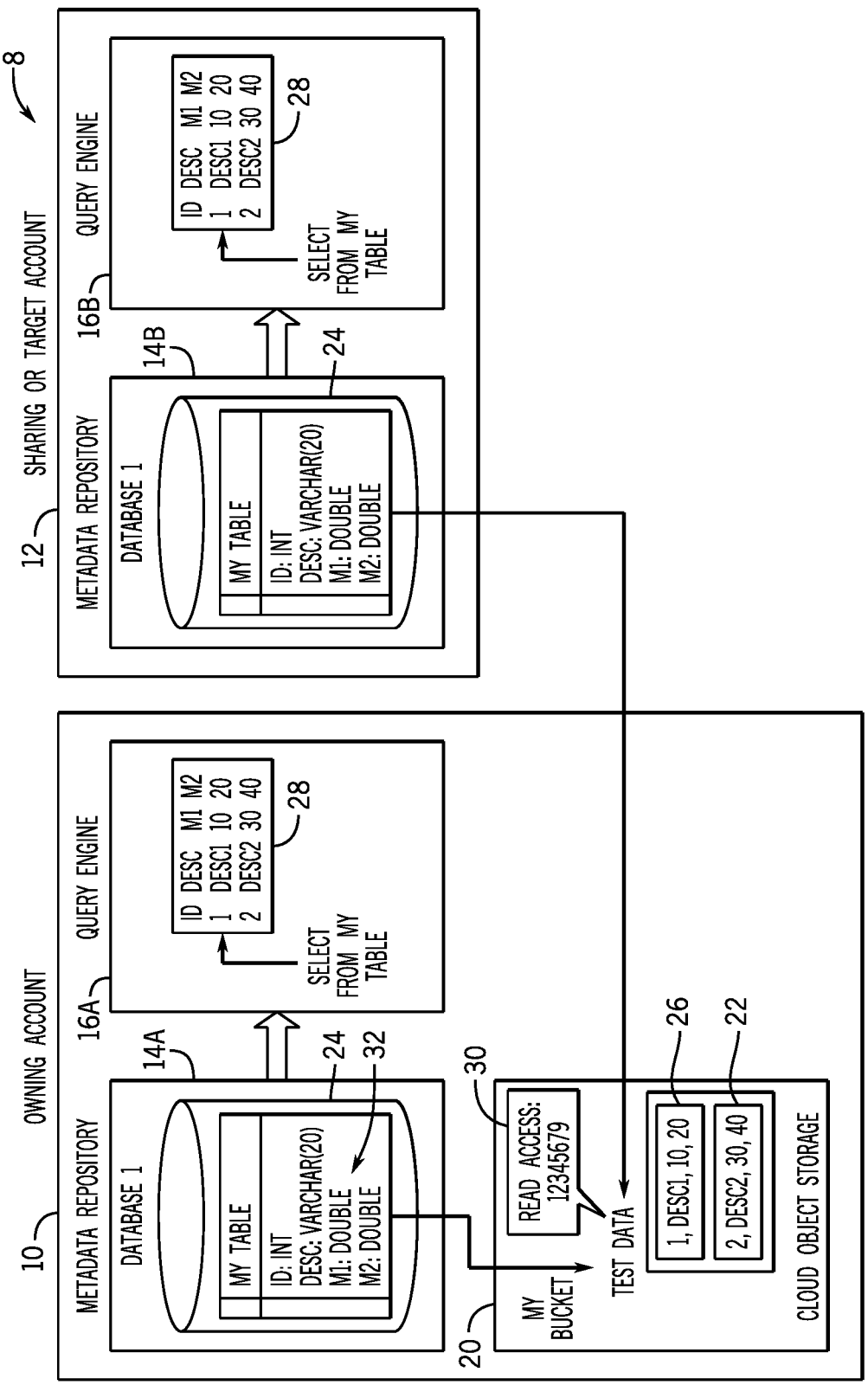
FIG. 1 is a schematic diagram of source data retrieval, in accordance with one or more current embodiments.

Turning now to the drawings, FIG. 1 is a schematic diagram of a data retrieval system 8, in accordance with one or more current embodiments. The data retrieval system includes an owning account 10 that has access to a cloud object storage 20, a metadata repository 14A for associating data contained within the cloud object storage (e.g., metadata for generating a relational table), and a data query engine 16A. The data retrieval system 8 also includes a sharing target account 12 that has access to a metadata repository 14B and a query engine 16B. In certain embodiments, the owning account 10 may enable the one or more sharing target accounts 12 to access data in the cloud object storage 20 based on identification information associated with the one or more sharing accounts 12.

The data 26 associated with the owning account 10 may be stored in a data bucket 22 of the cloud object storage 20. The metadata 32 corresponding to the data 26 may be carried in a metadata repository 14A structure of the owning account 10, which may format the metadata 32 from the data 26 into a relational table 24 (e.g., tabular structure). The relational table 24 may include a variety of data types such as an identification column that includes integer data, a description column that includes text data, and two metric columns that include doubles data. The metadata repository 14A of the owning account 10 may include names and data types for the various fields of the data 26 in the data bucket 22 within the cloud object storage 20. The query engine 16A of the owning account 10 may then retrieve the data 26 from the data bucket 22. The query engine 16A of the owning account 10, may then display the data 26 in a tabular form 28 by using both the data 26 included in the data bucket 22 and the metadata 32 of the fields in the data bucket 22 from the metadata repository 14A. It should be understood that the owning account 10 may have full access to the data 26 included in the data bucket 22. The data 26 may include data collected from one or more company related activities including advertising data, sales data, and the like.

In some embodiments, the sharing target account 12 may request access to the data 26 from the owning account 10. For example, the sharing target account 12 may send a request for the data 26 to the owning account 10. The request may include an identifier 30 associated with the sharing target account 12. For example, the owning account 10 may correspond to the billing department of an organization, and the sharing target account 12 may correspond to the advertising department of the same organization that may be requesting to access billing data for a project. The advertising department may send the request with the identifier 30 that corresponds to the advertising department. In other embodiments, the sharing target account may correspond to an external organization associated with the owning account 10. For example, the external organization may be a client of the owning account 10. It should be understood that the sharing target account 12 may correspond to an internal department or an external organization in relation to the owning account 10, and the identifier 30 sent with the request for data 26 may enable the owning account 10 to differentiate where the data request is originating from (e.g., internal account, external account).

The owning account 10 may also be able to determine a level of access to the data 26 based on the identifier 30 (e.g., role). In an aspect, the level of access may include read level access, read and write level access, or no access to the data. In another aspect, the level of access may also include the certain columns and/or rows of the data that the sharing target account 12 may receive access to. For example, the owning account 10 may determine based on the identifier 30 that the sharing target account 12 has read level access to the data 26 and may enable the sharing target account 12 to access the data bucket 22 and the metadata 32 associated with the data 26. The sharing target account 12 may then write queries to retrieve select data from the data 26 in the cloud object storage 20. Further, the sharing target account 12 may generate its own canonical (e.g., customized) data reports using the metadata 32 and the data 26. In yet another aspect, the level of access may indicate a type or a version of the data 26 that the sharing target account 12 may access. For example, the sharing target account 12 may not be able to access all the data associated with a data column in its raw form, but the sharing target account 12 may be authorized to view or access a cleaned version of the data (e.g., a version of data with personally identifiable information removed).

Figure 2:
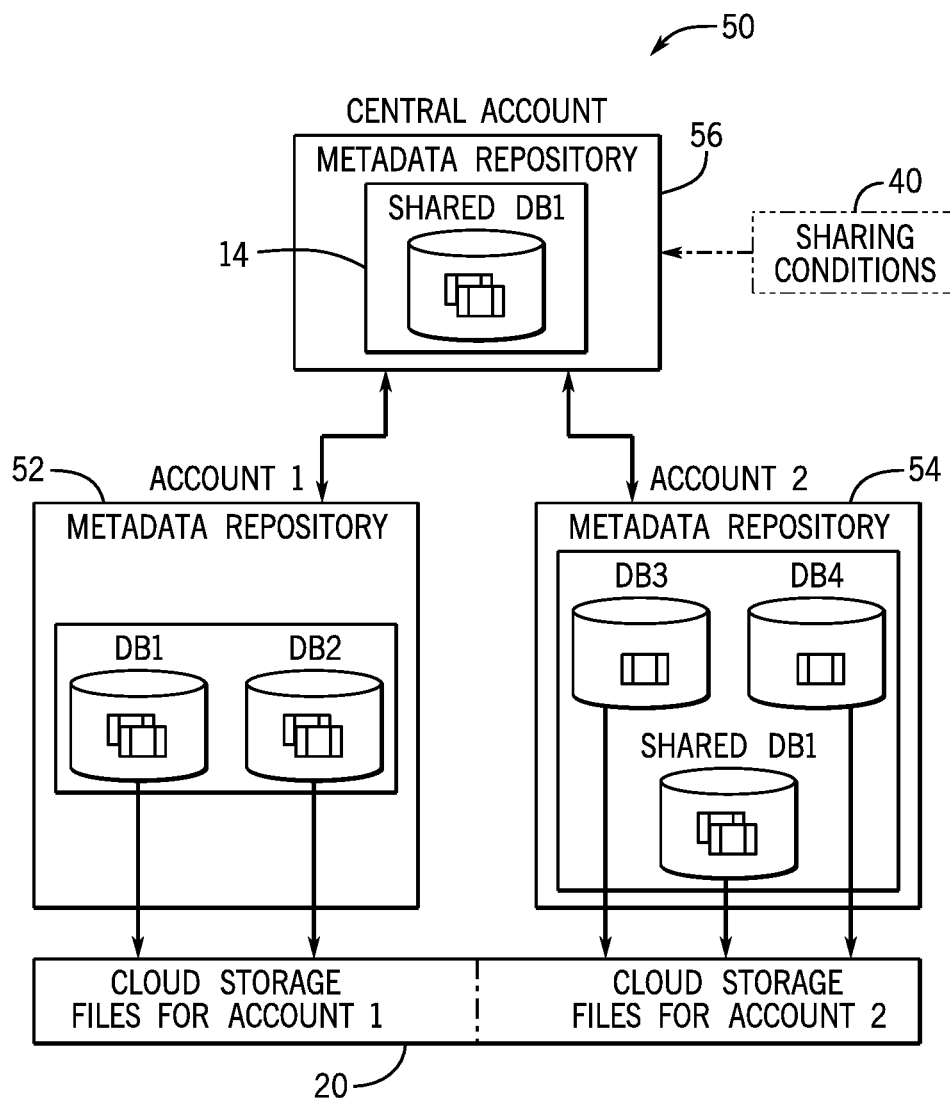
FIG. 2 is a schematic diagram of a data retrieval system managed by a central account that implements sharing conditions, in accordance with one or more current embodiments.

With the foregoing in mind, FIG. 2 is a schematic diagram of a centralized data sharing system 50 managed by a central account 56 that implements sharing conditions, in accordance with one or more current embodiments. The centralized data sharing system 50 may include a central account 56 with the metadata repository 14, a first account 52, a second account 54, and the cloud object storage 20. The central account 56 may enable the first account 52, the second account 54, or both to register select data sets with the central account 56 that may be shared with other accounts.

The centralized data sharing system 50 may enable a central account 56 to facilitate sharing from one account to another based on pre-determined sharing conditions 40 associated with the requesting account. For example, the first account 52 and the second account 54 may be associated with internal departments within the same organization. The second account 54 may request data associated with the first account 52 and/or that the first account 52 has access to. The second account 54 may communicate with the central account 56, which may act as a hub to facilitate access to the requested data. For example, the second account 54 may send a request for data to the central account 56, rather than requesting data directly from the first account 52. The central account 56 may then determine whether the second account 54 has access to the requested data associated with the first account 52 and whether the first account 52 has registered the requested data as sharable data. The central account 56 may include a library of one or more relational tables 24 based on the metadata 32 associated with the first account 52 sharable data, the second account 54 sharable data, or both. The central account 56 may then share the data in the library with requesting accounts, without the requesting accounts having to receive the data from the owner accounts directly. The central account 56 may then authorize access to the requested data from the owning account, and may enable the data 26 in the cloud object storage 20 associated with the owning account to be accessed by the requesting account.

Assuming the second account 54 is the requesting account, this may enable the second account 54 to access data independently of the first account 52, and may receive authorization to access the requested data from the central account 56. This enables data to be shared without the first account 52 involved in the transfer of data. The first account 52 may establish access rules for sharing the data associated with the first account 52. The first account 52 may then send the access rules to the central account 56, that may then facilitate sharing of data associated with the first account 52 based on the received access rules. This enables the central account 56 to be a central hub of data sharing independent of individual accounts, based on pre-established sharing rules provided by data associated with each account of the organization. As discussed above, the second account 54 may transmit a request to the central account 56 to access data associated with the first account 52. The central account 56 may determine based on access rules provided by the first account 52, a level of access to the data in the first account that the second account 54 has access to. The central account 56 may then transmit metadata 32 associated with the first account 52 from the metadata repository 14 to the second account 54. The second account may then use the metadata provided from the central account, to access data associated with the first account 52 from the cloud object storage 20. It should be understood, that either the first account 52, the second account 54, or both may request data from other accounts internal and external to the organization, that have communicated access rules to the central account 56.

In an aspect, the centralized data sharing system 50 may extend data sharing capabilities to external partner organizations by enabling the central account 56 to create and enforce sharing contracts with one or more external partner organizations. The sharing contracts may include data access rules that define external partner organizations access to data associated with one or more accounts of the organization associated with the central account 56. For example, the first account 52 associated with the same organization as the central account 56 may register information to be shared at the central account 56, which enables exposure of the data associated with the first account 52 to external partner organizations under certain conditions pursuant to the pre-established sharing contracts with the external partner organization. The external sharing contracts may be governed by legal agreements, data access requirements, and the like. The conditions of the external sharing contract may be determined by the central account 56 based on pre-stored sharing conditions associated with the central account 56 organization, and include information on what data may be shared (e.g., categories of data), and how the shared data may need to be obfuscated and/or processed. Additionally, the external sharing contract may include conditions provided by a separate entity (e.g., legal department, sales team) which may send the conditions to the central account 56 to implement data sharing based on the conditions.

Figure 3A:
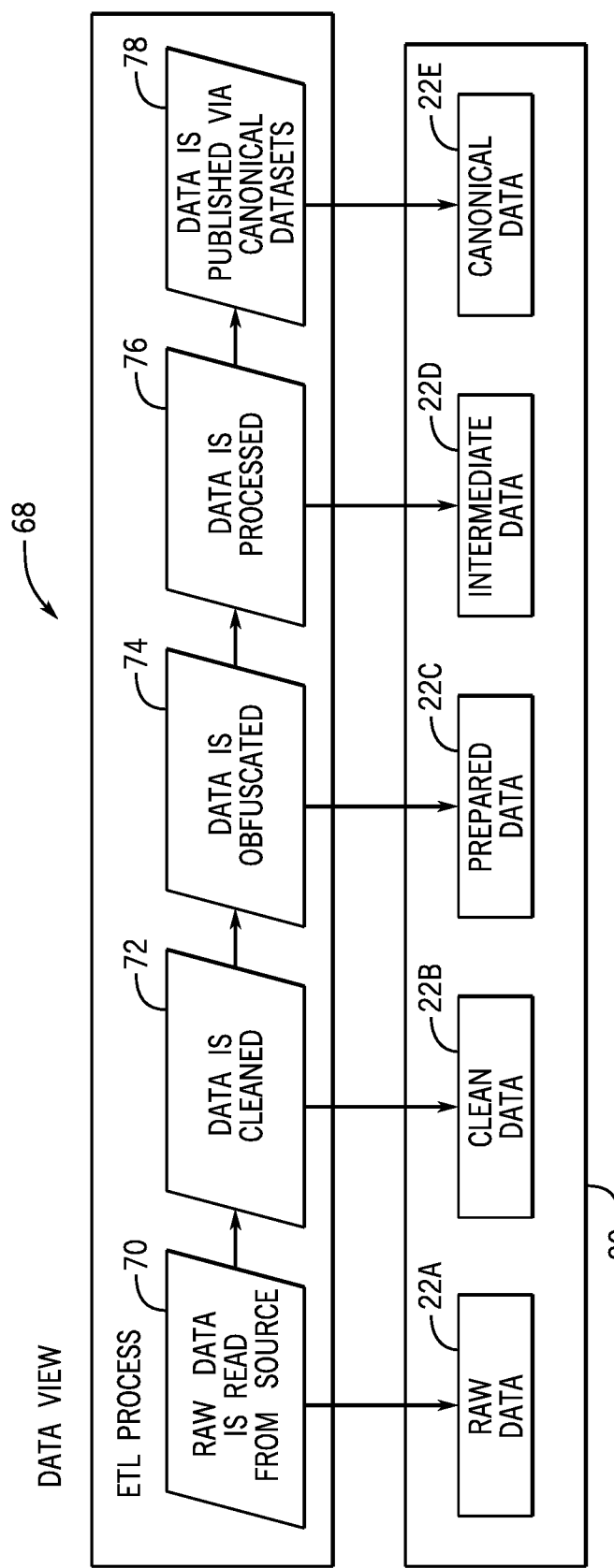
FIG. 3A is a flow diagram of a method of a canonical data set workflow with intermediary data sets, in accordance with one or more current embodiments.

With the foregoing in mind, FIG. 3A is a flow diagram of a method 68 of a canonical data set workflow with intermediary data sets, in accordance with one or more current embodiments. During data sharing, data may be curated to provide canonical data sets that may be shared based on given sharing conditions. The customization of the data sets may take place throughout the extract, transmit, and load (ETL) process for retrieving data from data sources (e.g., cloud systems, databases).

For example, an account, at block 70, requests data from a data source (e.g., cloud object storage 20). The account may then read the raw data from the data source, and deposit the raw data into a data bucket 22A in the cloud object storage 20 associated with the raw data. The account, at block 72, cleans the raw data received from the data source to remove non-printable characters from the data. The cleaned data is then saved to a data bucket 22B in the cloud object storage 20 associated with the clean data.

The account, at block 74, obfuscates the cleaned data based on organization requirements and/or pre-established requirements for removing information from the collected data. The requirements may include removing personally identifiable information (PII), security information, and the like. The obfuscated data may then be saved to a data bucket 22C in the cloud object storage 20 associated with prepared data, to signify that the data has been obfuscated according to organization rules. The account, at block 76, processes the obfuscated data according to any further restrictions applicable to a requester of the data. For example, the cloud object storage 20 may detect that a requester is only allowed read access to part of the data and may remove data that is not associated with requester access. The further processed data, may again be saved into a data bucket 22D associated with the intermediate data to the cloud object storage 20 for later retrieval. The account, at block 78, publishes the processed data via the canonical data sets for use within the organization, and the canonical data may again be saved into a data bucket 22E associated with the canonical data of the cloud object storage 20. The same initial raw data may serve as the basis for different canonical data sets depending on the parameters for obfuscating and processing the raw data. Similarly, the method 68 may be repeated at predetermined intervals where the underlying raw data stored in the cloud object storage 20 has been updated. This method 68 enables data to be stored at multiple points in the data processing, and enables efficient retrieval of data at multiple points in the ETL process.

Figure 3B:
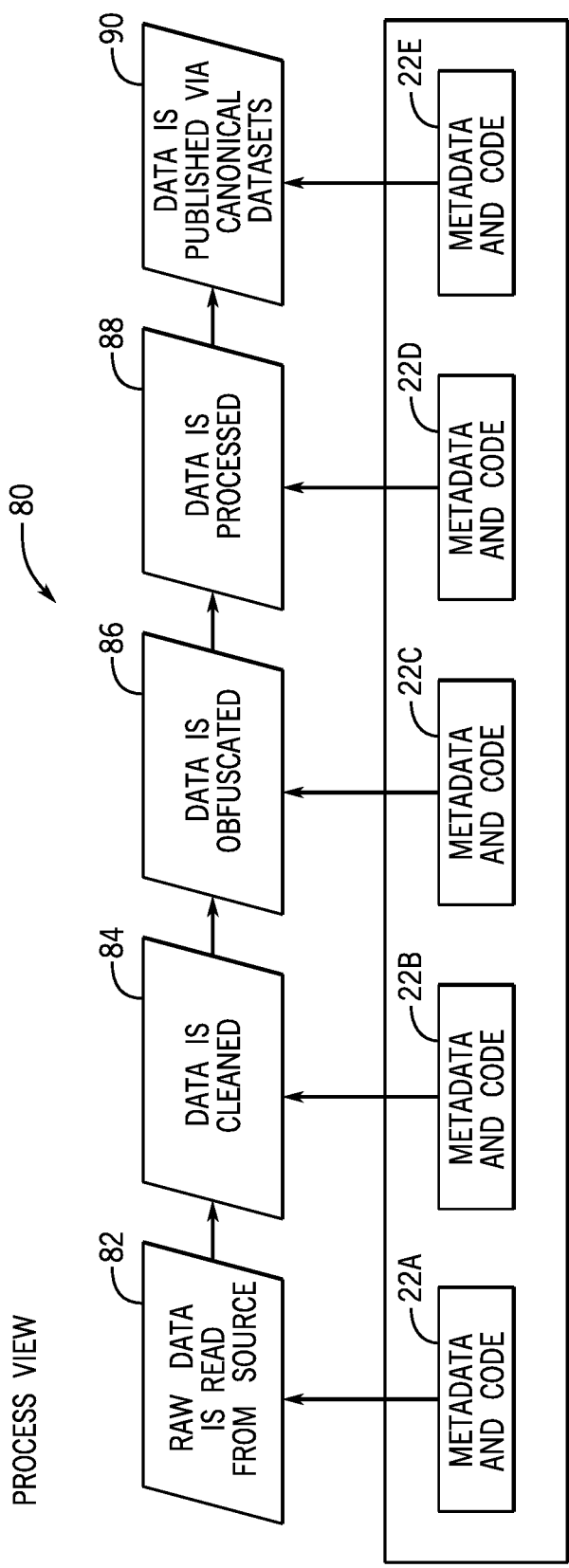
FIG. 3B is a flow diagram of a method of retrieving processed data sets using metadata, in accordance with one or more current embodiments.

Further, FIG. 3B is a flow diagram of a method 80 of retrieving data sets using metadata 32, in accordance with one or more current embodiments. The method 80 may enable access to metadata 32 that points to code locations of ETL processes. This may enable accounts requesting data associated with an owner account to receive access to data at any point throughout the ETL process for the owner account.

For example, the requesting account, at block 82, activates a first step function to read raw data from the cloud object storage 20. Each step function may access metadata 32 that points to a code location associated with the ETL processing step. For example, the first function may be activated to read raw data from a source location. The metadata 32 associated with the first step function may direct the data source to retrieve the requested data with certain parameters from the data source, retrieve the data from the source, and write it to the cloud object storage 20. The requesting account, at block 84, activates a second step function to clean the raw data to remove non-printable characters from the data. The second step function may access a metadata store to retrieve metadata 32 to clean the file. The metadata 32 may include code that instructs the processing function to read a line of code of the data source file, query for non-printable characters in the file, suppress the non-printable characters identified in the file, or write the line with the exclusion of the non-printable characters to a new file.

The requesting account, at block 86, activates a third step function to obfuscate the data to remove certain information (e.g., personally identifiable information, security information). The personally identifiable information and other data may be stripped from the data set, which enables certain data to be restricted when sharing the data to a third-party requesting account. The requesting account, at block 88, activates a fourth step function that is called to process the data to generate an intermediate data set. The intermediate data set may include further obfuscations (e.g., removing data unrelated to the requestor, or removing data that the requester has not paid to access). If an account associated with the data is merged with requester data, the intermediate data may represent the transformation of the data (e.g., merge data fields) from the account data source and from the requester into common data representations which may be utilized by one or more organizations associated with the source data account and the requesting account. For example, an organization may have an IP address associated with the requested data, and the IP address may complete processing steps to encode the IP address. The encoded received data may be queried for the encrypted IP address associated with the requested account, to retrieve data fields associated with the IP address. This enables the requesting account to access data associated with known IP addresses, but the requesting account does not receive access to encoded data not associated with known IP addresses of the requesting account.

The requesting account, at block 90, activates a fifth step function that is called to publish canonical data sets. The canonical data sets may be created and presented to business users of the requesting organization, and the canonical sets may also be customized to meet various business needs. The portion of requested data that is published as a canonical set is considered available for public consumption within the organization. In addition to customizing the canonical data sets, the workflows in FIGS. 3A and 3B may also be customized for a particular business function, organization, requesting user, and/or source user. As mentioned, the customization may be implemented via the particular metadata and source code within each step function. In another aspect, the customization may include dynamically adding or removing one or more step functions (may also be known as instruction sets) such that the workflow includes a different number of step functions (e.g., 3, 4, 6, 7, etc.) as compared to FIGS. 3A and 3B. Such customizations may be used to generate different canonical data sets.

Figure 4:
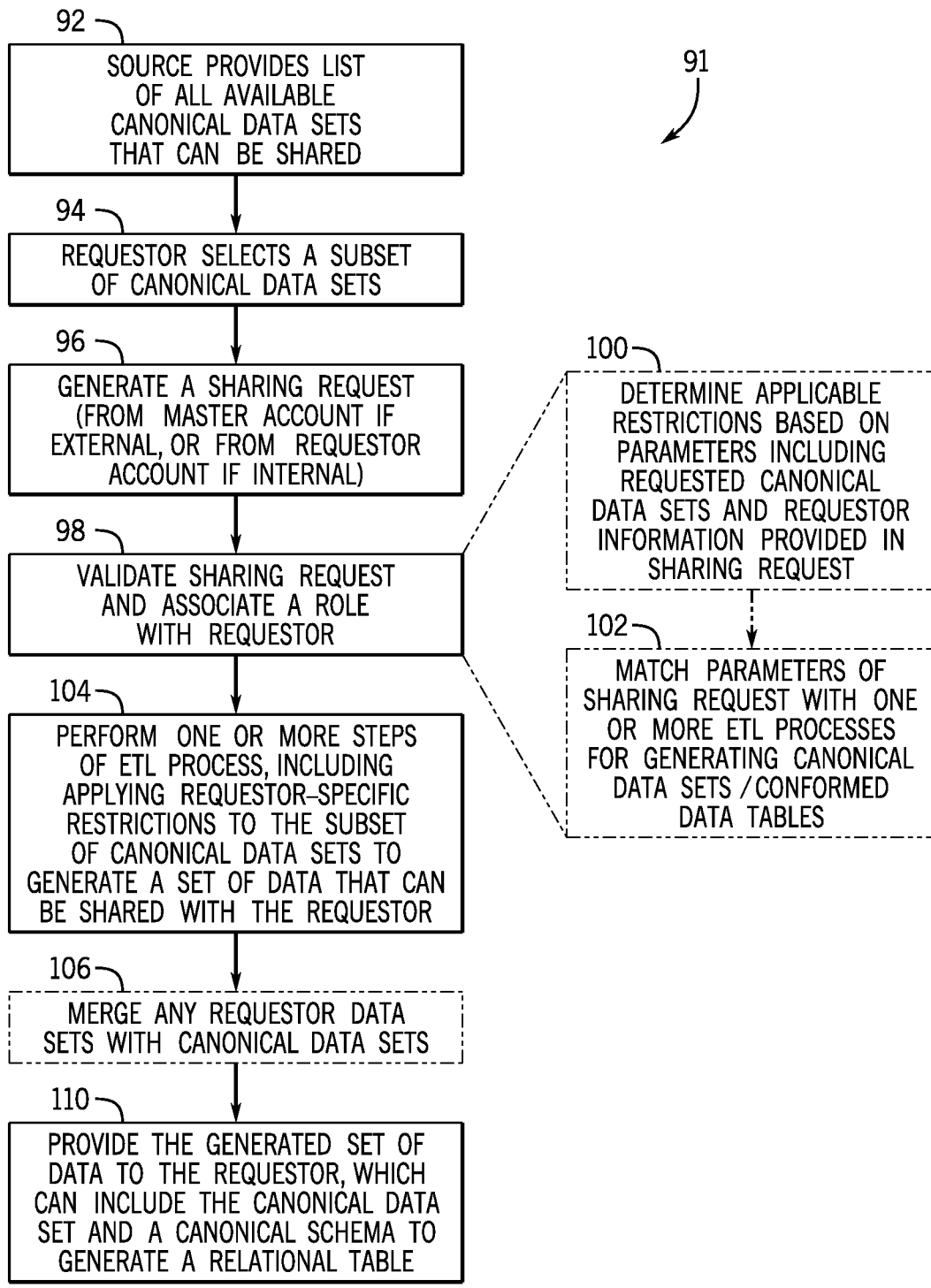
FIG. 4 is a flow diagram of a method of canonical data set sharing, in accordance with one or more current embodiments.

With the foregoing in mind, FIG. 4 is a flow diagram of a method 91 of data sharing of the canonical data sets, in accordance with one or more current embodiments. Organizations may share data within an organization or with another partner organization based on establishing canonical datasets that may be shared with authorized requesting organizations. The blocks in FIG. 4 may be performed by the centralized data sharing system 50, including one or more components within the data sharing system 50. Although the blocks are described in a particular order, the method 91 may also be performed in a different order, and one or more blocks in the method 91 may be added or omitted.

Referring to FIG. 4, at block 92, the centralized data sharing system 50 may detect a log in from a requesting account to an access system. Upon logging in, the requesting account may be provided with a list of one or more pre-defined canonical data sets associated with one or more source accounts. In an aspect, the pre-defined canonical data sets may be provided according to a contract associated with the requesting account. The pre-defined canonical data sets may be datasets that contain processed data based on previous ETL processing on the data. As an example, pre-defined canonical data sets may include a number of impressions (the number of times an ad was displayed), a reach (the number of people who saw the ad), clicks (the number of times people clicked on an ad), and/or click through rate (clicks divided by impressions), among others.

In an aspect, the pre-defined canonical data set may be defined within a master account. The master account may then share access to the pre-defined canonical data set to other accounts (e.g., the requestor account), so that users have one or more pre-defined canonical data sets readily available data upon logging in without having to create their own. Alternatively, if a requesting account does not see a pre-defined canonical data set that would meet their data requirements, the requesting account may request a canonical data set that is customized to the needs of the requesting account.

At block 94, the centralized data sharing system 50 may receive a selection of one or more canonical data sets.

At block 96, the centralized data sharing system 50 may generate a sharing request from the central account 56 and/or a requester account in response to receiving a selection of the canonical datasets. In an aspect, the sharing request may be generated from the central account 56 if the request is from a partner organization external to the organization, and may be from the requester account if the request is from an internal department of the organization associated with the source data.

At block 98, the centralized data sharing system 50 validates the sharing request and associates a role with the data requester. Validating the sharing request may include checking an identifier associated with the requestor, and verifying that the requester has pre-approved access for the data. The role associated with the requester may include requester credentials that define the level of access the requestor may have to the data and/or subsets of the data. The role may be associated with a division of a company, which may be associated with a level of predetermined access for the company division. For example, as part of validating the sharing request, the centralized data sharing system 50 may, at block 100, determine based on the requestor information provided in the sharing request, application restrictions based on parameters associated with the sharing request. The parameters may include canonical data sets requested, role information, and the like. The restrictions may include read/write restrictions, certain columns and/or fields of the data set being restricted, and the like. Further, at block 102, the centralized data sharing system 50 may match the parameters of the sharing request with one or more ETL processes for generating canonical data sets. For example, previous ETL processing on the data to implement restrictions may match the parameters for the requested data restrictions.

At block 104, the centralized data sharing system 50 may perform one or more steps of the ETL process, including applying requestor specific restrictions to the canonical data sets to generate a set of data that can be shared with the requestor. As discussed above, the restrictions may include security restrictions, restrictions of certain fields, and the like. The steps in block 104 may be optional when the platform on which the canonical data set is to be viewed allows for filtered views such that the requestor ultimately may not be able to see the entire shared data set but only a limited portion of it. In that sense, the ETL process is not needed because the view filtering may accomplish a similar result.

At block 106, the centralized data sharing system 50 merges any requestor data sets with the canonical data sets. For example, if parameters and/or restrictions were applied to the requestor data sets they may be merged with the canonical data sets. In an aspect, the requestor data set and the canonical data set may be made available on a platform that allows for users to view the merged data set (a data set with the requestor data set and the canonical data set) under predefined conditions (e.g., no ability to copy or modify the merged data set). In another aspect, the requestor data set and the canonical data set may each be located on separate platforms or systems, and in order for the merging to occur, both data sets may be exported to an escrow platform permitted to contain both data set. In this aspect, the escrow platform may enable the requestor to view the merged data set under predefined conditions. As part of block 106, the centralized data sharing system 50 may determine which type of platform the merged data set is to be viewed in order to determine whether an escrow platform is needed.

At block 110, the centralized data sharing system 50 provides the generated set of data to the requestor. The generated set of data may include the canonical data and a canonical schema to generate a relational table for the requester to view the generated set of data. In an aspect, the generated data may refer to just the canonical data set or the merged data set (as described with respect to block 104).

Figure 5A:
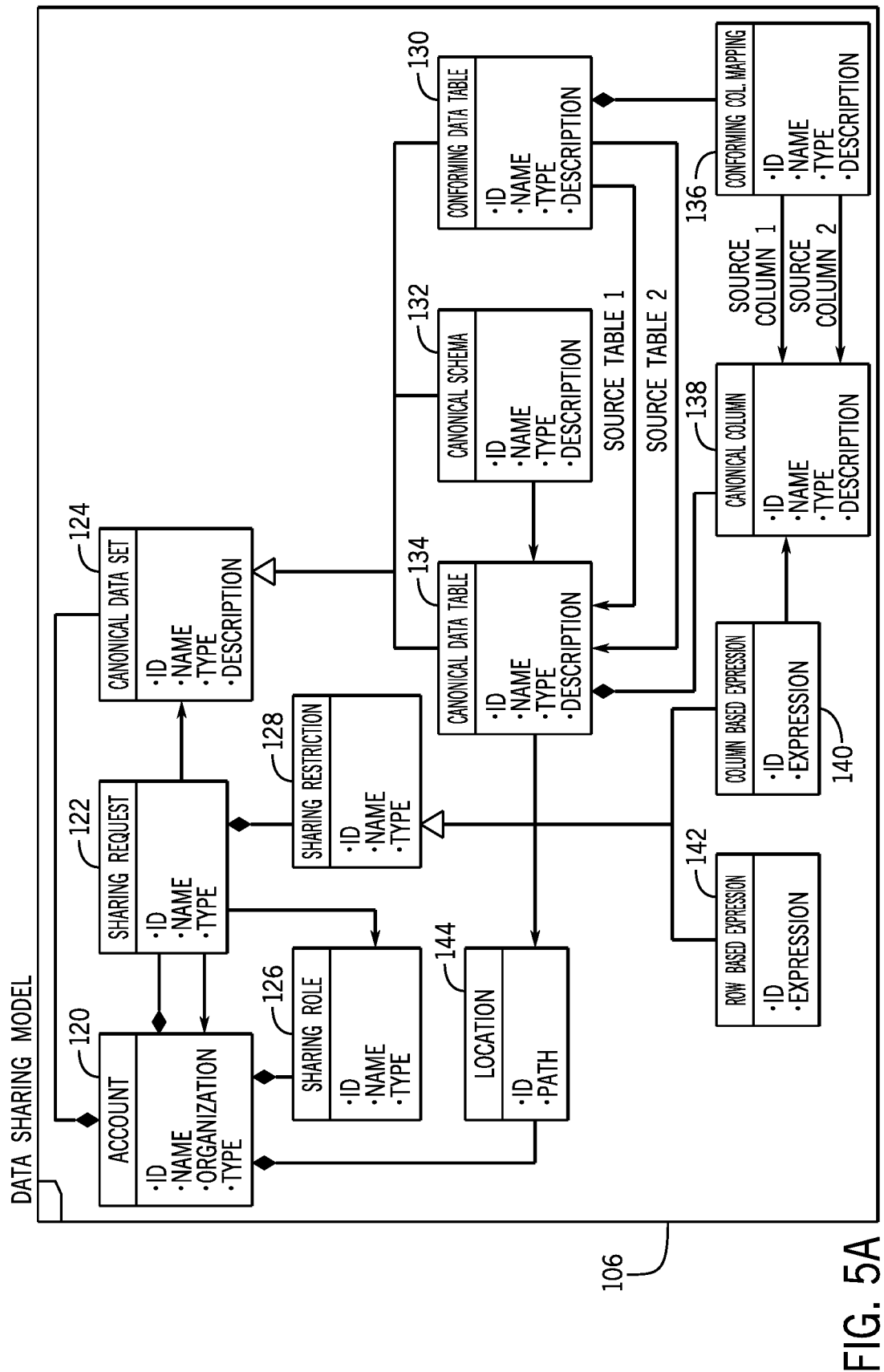
FIG. 5A is a diagram of data sharing by object instances, in accordance with one or more current embodiments.

With the foregoing in mind, FIG. 5A is a diagram of a declarative model of data sharing by object instances, in accordance with one or more current embodiments. The data sharing may involve the transfer of data between object instances based on the sharing request 122 initiated by a requesting account. The object instances may be associated with owner accounts, requesting accounts, and central accounts 56. It should be understood that the object instances may facilitate the sharing requests 122 between the accounts.

The black diamonds and arrows in the diagram represent unified modeling language (UML) constructs. The black diamond indicates that an object reference owns the referenced object (e.g., if you delete the parent instance all child instances are deleted). For example, an account definition 120 may own a sharing request 122 (e.g., originate the sharing request). The sharing request 122 is depicted as an object associated with the sharing request 122 that includes an identification associated with the source account for the requested data, a name of the requested data, and an object type. The arrows represent one-way navigation between two object instances. The account definition 120 may represent either an owning account, central account 56, and/or a sharing target account and may include identification associated with the account, a name of the account organization (e.g., sales department, advertising department), and a type (e.g., sharing enabled, active) associated with the account. For example, the account definition 120 may be a requesting account that owns the sharing request 122, and a source account (e.g., owning account) that receives the sharing request 122. Although one account definition 120 is shown in FIG. 5A, the account definition 120 is intended to represent two or more accounts (e.g., the central account 56, the source account, requesting account).

A sharing request 122 may originate from the requesting account, and be sent to the data owner account that includes data to be shared. Additionally, the requesting account may own a sharing role 126 that includes identification associated with the requestor, a name of the requested data, and a credential associated with access level to data of the source account organization. The source account may recognize the sharing role 126 associated with the requesting account, and utilize the credentials and identification to determine sharing restrictions 128 (e.g., column restrictions, row restrictions) to apply to the requested data. The sharing request 122 may route to the canonical data set 124 which may include a canonical data table 134 (e.g., file), a canonical schema 132 (e.g., group of data tables), and/or a conforming data table 130 (e.g., transformed data table). The conforming data table 130 may include two source data tables that may be combined to create the conforming data table 130. The conforming data table 130 represents the canonical data sets 124 associated with the sharing request 122. The canonical data table 134 may be a file, and the conforming data table 130 may be data with removed columns and/or fields based on the sharing restrictions 128 associated with the sharing request 122. The canonical schema 132 may be tables related to the requested shared data. As discussed above, the conforming data table 130 may include two source tables that combine two sets of data into the conforming data table 130. Alternatively, the conforming data table 130 may include a single data table in which the data has been obfuscated and processed to match criteria in the sharing request 122. In an aspect, the source tables may be associated with or originate from the same organization as the requesting account or the source account. In another aspect, source tables may come from different internal and/or external organizations and combined to create the conforming data table 130. Additionally, the conforming table 130 includes conforming column mapping 136 that provides mapping between the source data tables. The conforming column mapping 136 may be sent to the canonical column 138 along with the column-based expression 140 resulting from the sharing restrictions 128 based on the sharing request 122.

Further, the row-based expression 142 may include expressions that indicates how to remove rows from the canonical data set (e.g., rows that correspond to a certain company). For example, the role of the requestor may correspond to removing rows associated with a certain company, organization, business unit, and the like from the data set. The expression may include instructions to remove data, and may point to a specific row within the data set. The cloud object location 144 refers to the location of the canonical data set within the cloud object storage 20.

For internal sharing requests, the sharing request 122 may be sent by one business units to a master account (e.g., central account 56), in order to access the data made available for sharing from another business unit. For external sharing requests, the sharing request may be generated and sent by the master account on behalf of the requestor based on the values selected by the requestor, and a sharing contract between the requestor and the owning account. For example, a sharing request 122 may be initiated and include an identification associated with the requestor, a name of the requested data, and an object type. An owning account may receive the generated sharing requested, and may determine the selected canonical data set 124, and restrictions that may apply to the requesting account based on the identification information of the requesting account. Each instance may include an identification associated with the requestor, a name of the requested data, and an object type, an expression, or a description of the data.

In some embodiments, the row-based expression 142 may be executed (e.g., we can only share certain data types within the organization, remove all rows corresponding to inter organization data types). The instances may also execute column-based expression 140 that may be executed to suppress data from a particular column based on the restrictions associate with the requesting account. For example, a column with personal identification information may be removed from the data set. The canonical data may include raw data, schema, table, metadata entries, and the like. After the requesting account restrictions are applied to the canonical data to remove data that corresponds to the restrictions, the conforming data table 130 may be generated that conforms the previous canonical data set 124 to the additional requirements. The step of generating the conforming data table 130 may take place based on the data processing step of FIG. 3B.

Figure 5B:
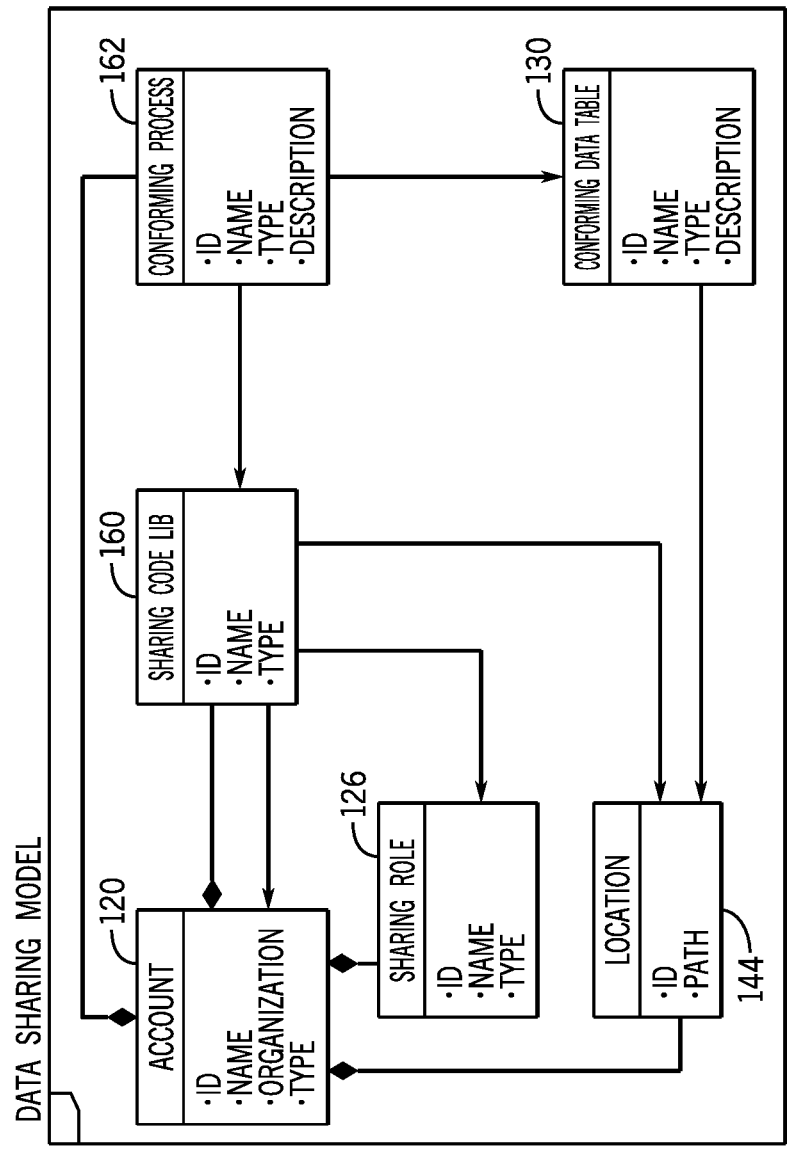
FIG. 5B is a diagram of code and processing steps for generating data and information for data sharing, in accordance with one or more current embodiments.

With the foregoing in mind, FIG. 5B is a diagram of the code and processing for generating data and information for data sharing, in accordance with one or more current embodiments. When a conforming process 162 is identified for requested data during data sharing operations based on the user selection of the requested data, the code that executes the conforming process 162 may be shared and executed. A sharing code library 160 may include multiple pieces of code specifically written to execute the conforming process 162 and/or step function that outputs the requested data using the conforming data table 130.

For example, the conforming process 162 may be created that points to certain sharing code libraries 160 that run code for the specific sharing role 126 associated with the requesting account. The sharing code libraries 160 may correspond to a specific location within the cloud object storage 20 that includes the requested data. Additionally, the sharing code libraries 160 may run code that executes data processing (e.g., data obfuscation, further data processing) according to the specific sharing role 126 corresponding to the requesting account. In another aspect, the sharing code libraries 160 may include code/libraries originating entirely from an organization corresponding to the source or the requesting account. In another aspect, the sharing code libraries 160 may include code/libraries aggregated or compiled from different external organizations or users. For example, a requesting account may contribute code or libraries into the sharing code libraries 160 in order to generate the conforming data table.

Further, the sharing object (e.g. data set) may also be placed at a specific location within the cloud object storage 20, which may be referenced by the cloud object location 144 and include an identification corresponding to the data set and a path to access the data within the cloud object storage 20. For example, a requestor may correspond to a specific role associated with one or more code within the cloud object storage 20. The code may be executed and result in a conforming data table 130 associated with the requested data being transferred to a specific location within the cloud object storage 20, based on the conforming process 162. It should be understood that the sharing code libraries 160 may be supplied by the source account associated with the requested data (e.g., when removing columns and/or rows of the source data), or the requesting account if the conforming process 162 needs to merge data from the requesting account into the data associated with the source account.

Figure 6:
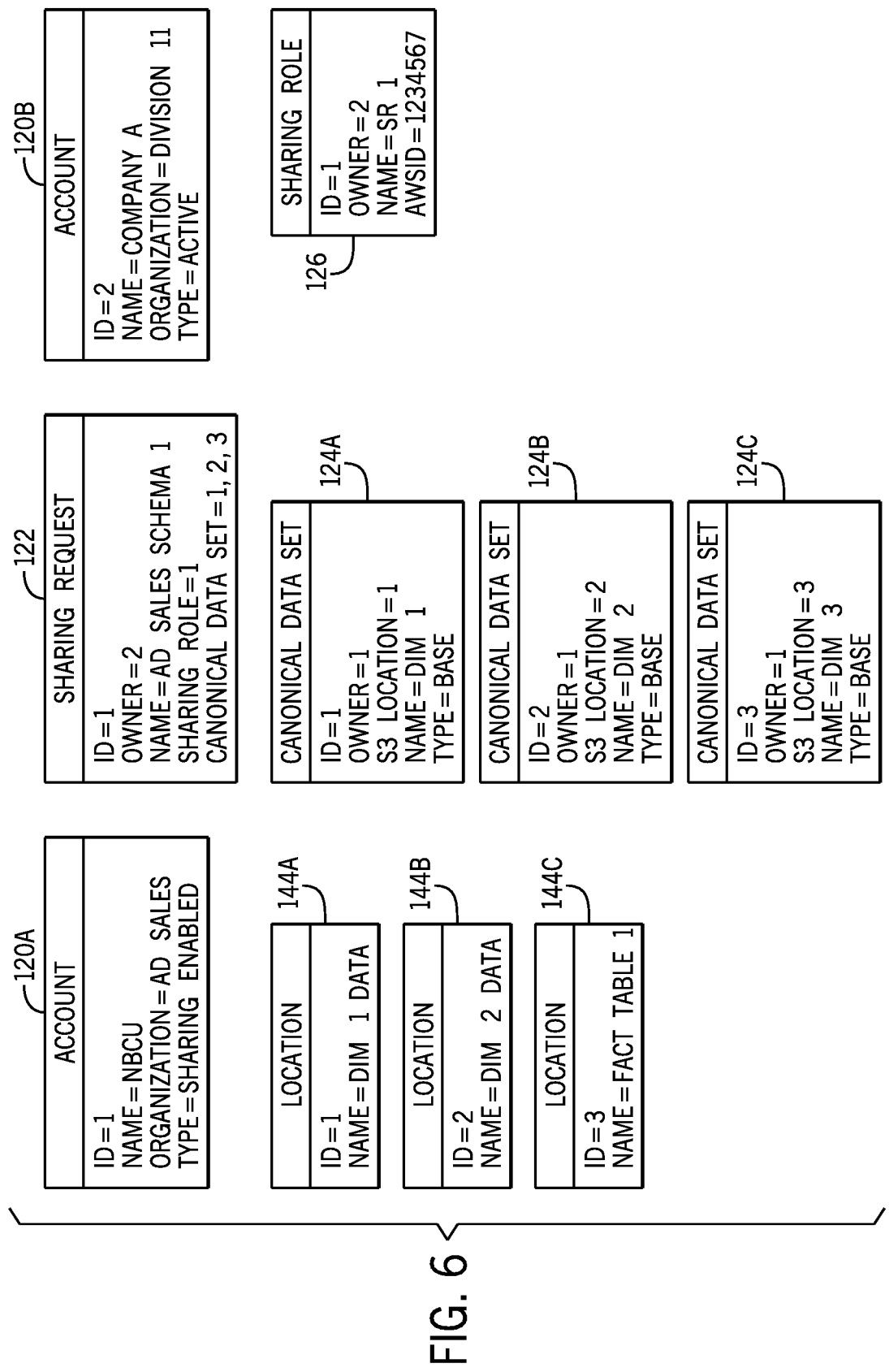
FIG. 6 is a diagram of the object instances involved in the data sharing of FIG. 5A, in accordance with one or more current embodiments.

With the foregoing in mind, FIG. 6 is a diagram of instances involved in the data sharing of FIG. 5A, in accordance with one or more current embodiments. The instances may include identification of the source account and/or requesting account, and other information related to organizations of the accounts and requested data associated with the accounts.

For example, a requesting account instance 120B may include an identification number for the requested account, a name of the company and the internal and/or external organization associated with the account, and a type of account access relative to the data request. For example, a requesting account instance 120B may include an ID number of 2, a name of the company, a division of the company, and an indication that the account is active. The request for data from the requesting account instance 120B, may result in the creation of the sharing request 122 that may be generated by the requesting account itself, or the central account 56. The sharing request 122 may include an identification corresponding to an owner account of the requested data, an owner of the sharing request (e.g., the requesting account), the name field(s) corresponding to the one or more requested data sets, a sharing role ID number, and specific data sets requested. The sharing role ID number may correspond to the sharing role 126 that includes identification of the account associated with the requested data, the owner of the requested data, the name of the sharing role, and a credential number associated with the requestor level of access to the data. The owner data account may also include an account instance 120A, that includes an ID number associated with the owning account, a name of the account, an organization corresponding to the account, and a level of access associated with the data of the account. For example, the type may correspond to sharing enabled and the data associated with the owner account instance 120A may be shared with other approved accounts.

As discussed above, the requested data may include location instances 144A, 144B, 144C that provide path access to the requested data sets. The location instances 144A, 144B, 144C may correspond to each requested data set, for example each location instance may correspond to the identification number associated with the data set and a path to access the data set in the cloud object storage 20. The canonical data set instances 124A, 124B, 124C may store information related to the data sets, and may include an identification corresponding to the data set, an owner account associated with the data set, a location instance associated with the data set, and a type of data (e.g., base data, obfuscated data) associated with the data set. It should be understood that any number of instances may be utilized during the data sharing process to execute the data sharing from the central data source.

Figure 7:
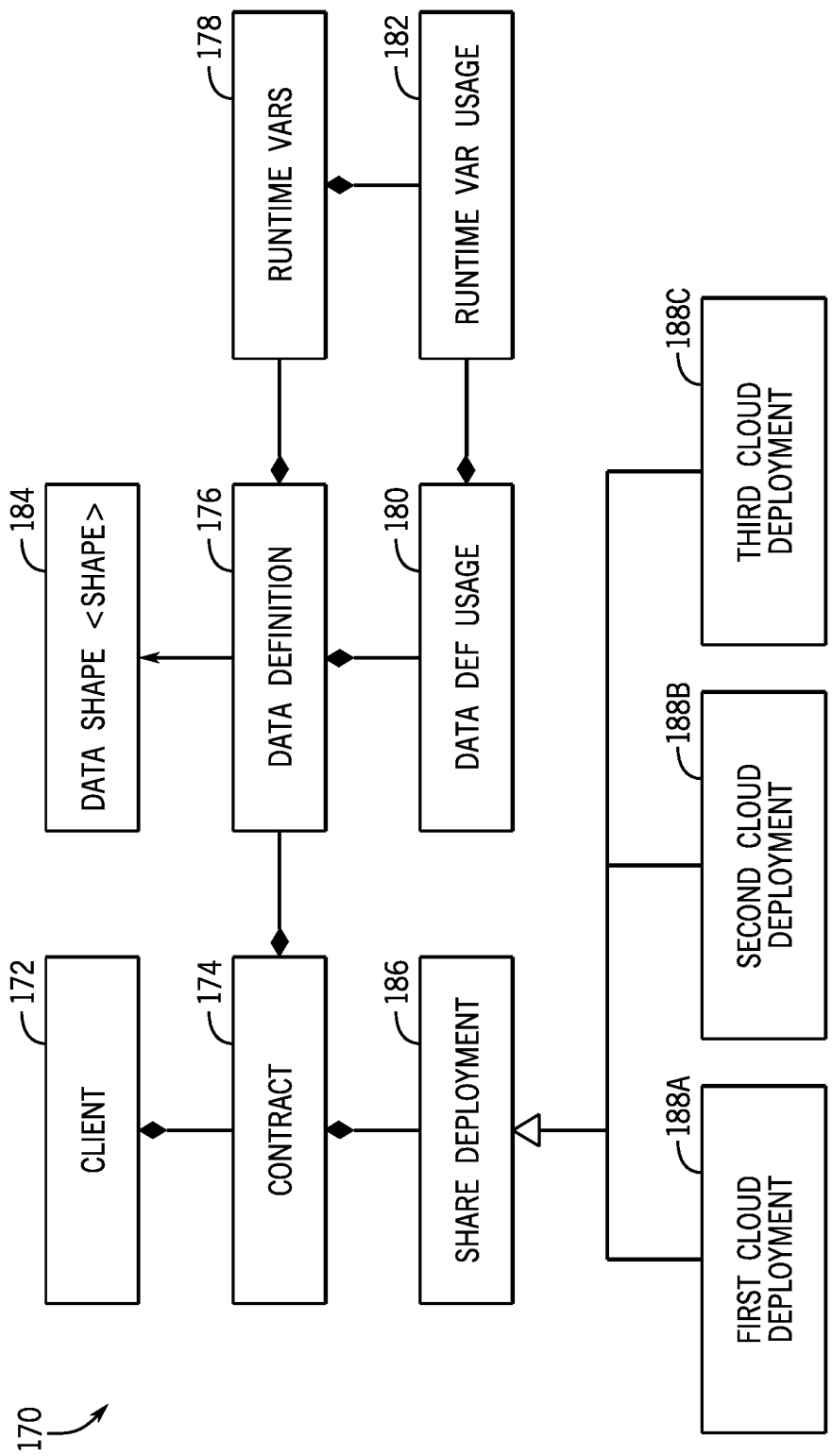
FIG. 7 is a block diagram of a data sharing model that may be incorporated by the centralized data sharing system of FIG. 2, in accordance with one or more current embodiments.

FIG. 7 illustrates a data sharing model 170 that may be incorporated by the centralized data sharing system 50. Referring to FIG. 7, a client 172 (e.g., a requestor account) may own one or more instances of a contract 174, which defines conditions by which the client 172 or its affiliates may access data. Each contract 174 may include data definitions 176, which define the type of data that is to be accessible by the client 172. For example, the data definitions 176 may include impression data, click data, or other usage data related to content (e.g., advertisements). The data definitions 176 may also include runtime variables 178 that are to be provided by the user at run time in order to generate canonical data sets. Examples of runtime variables 178 may include a name of an ad campaign, a date range, etc. A data definition 176 may be associated with a data definition usage 180, which may be thought of as an instance of the data definition having a particular value. For example, in the case of the data definitions 176 including impression or click data of advertisements, a data definition usage 180 may be an impression or number of impressions (e.g., times accessed or viewed) for a particular advertiser. Similarly, a runtime variable usage 182 may be considered an instance of the runtime variable 178 with a particular value (e.g., a particular client or advertiser). Together, the collection of data definitions 176 may form a data shape 184, which is described in more detail under FIG. 8.

Continuing with FIG. 7, each contract 174 may be associated with a share deployment 186, which specifies what platform the canonical data set generated in accordance with the contract 174 is to be provided to the client. The platforms may include, but are not limited to, Snowflake, Bastion, and/or Amazon S3. Because each platform may have different accessibility requirements and data cleaning requirements, platform specification will impact how the canonical data set is generated and shared. As such, a particular deployments 188 (referring collectively to deployment 188A, deployment 188B, and deployment 188C) that are specific to a particular platform may be utilized. For instance, the deployment 188A may be specific to a first cloud platform, such as Snowflake. The second deployment 188B may pertain to a second cloud platform, such as Bastion. The third deployment 188C may be specific to a third cloud platform, such as Amazon S3. Furthermore, while the deployments 188 are provided in FIG. 7, it should be noted that other deployments 188 (e.g., associated with other platforms) may be utilized in other embodiments.

Figure 8:
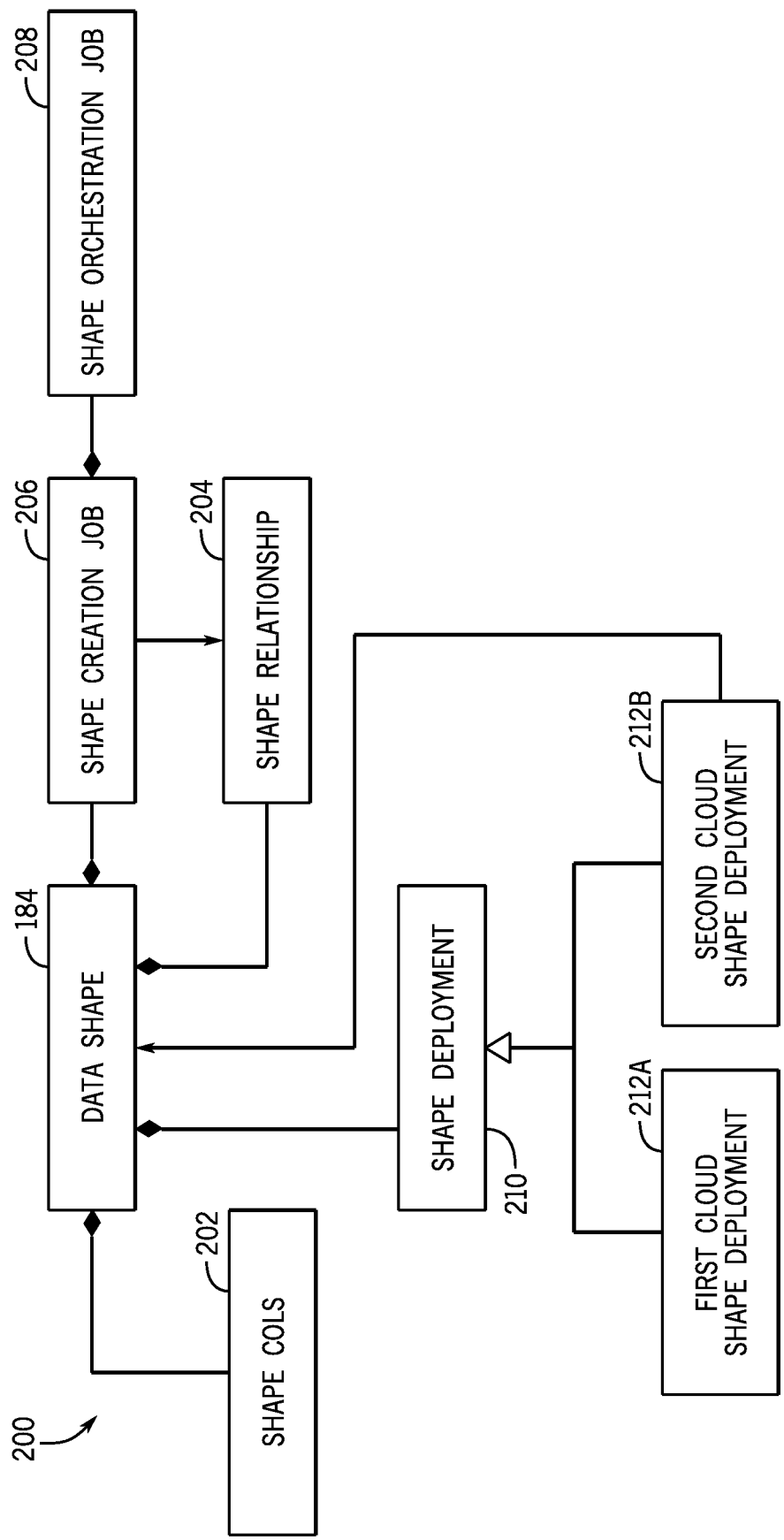
FIG. 8 is a block diagram of a model of the data shape of FIG. 7, in accordance with one or more current embodiments.

FIG. 8 illustrates a model 200 of a data shape 184 (e.g., the data shape 184 of FIG. 7) and how the data shape 184 may be generated. A data shape refers to collection of data, such as a canonical data set. In an aspect, the data shape 184 may be a data table. The data shape 184 may have defined columns 202 defining the type of data that is to be populated in each column of the columns 202. The data shape 184 may also have defined rows defining the type of data that is to be populated in each row. In an aspect, the data shape may point to, refer to, or consist of other data shapes. Such information may be denoted as a shape relationship 204. As such, when a canonical data set is created, via a shape creation job module 206, for example, the shape creation job module 206 may populate the data shape 184 based on certain criteria (e.g., data definition and runtime variables) and also generate new data shapes by combining existing data shapes. Indeed, a shape orchestration job 208 may be called by the shape creation job module 206 to incorporate data from other data shapes. In an aspect, each data shape 184 may also contain information on the manner in which the data shape 184 is to be deployed or shared, which may be a shape deployment 210. The shape deployment 210 may be carried out for particular platforms. For instance, the deployment 212A may be specific to a first cloud platform, such as Snowflake. The deployment 212B may be specific to a second cloud platform, such as Amazon S3. Also, it should be noted that, in other embodiments, additional or other deployments 212 may be utilized. For example, a deployment 212 specific to another cloud platform, such as Bastion, may be used.

Figure 9:
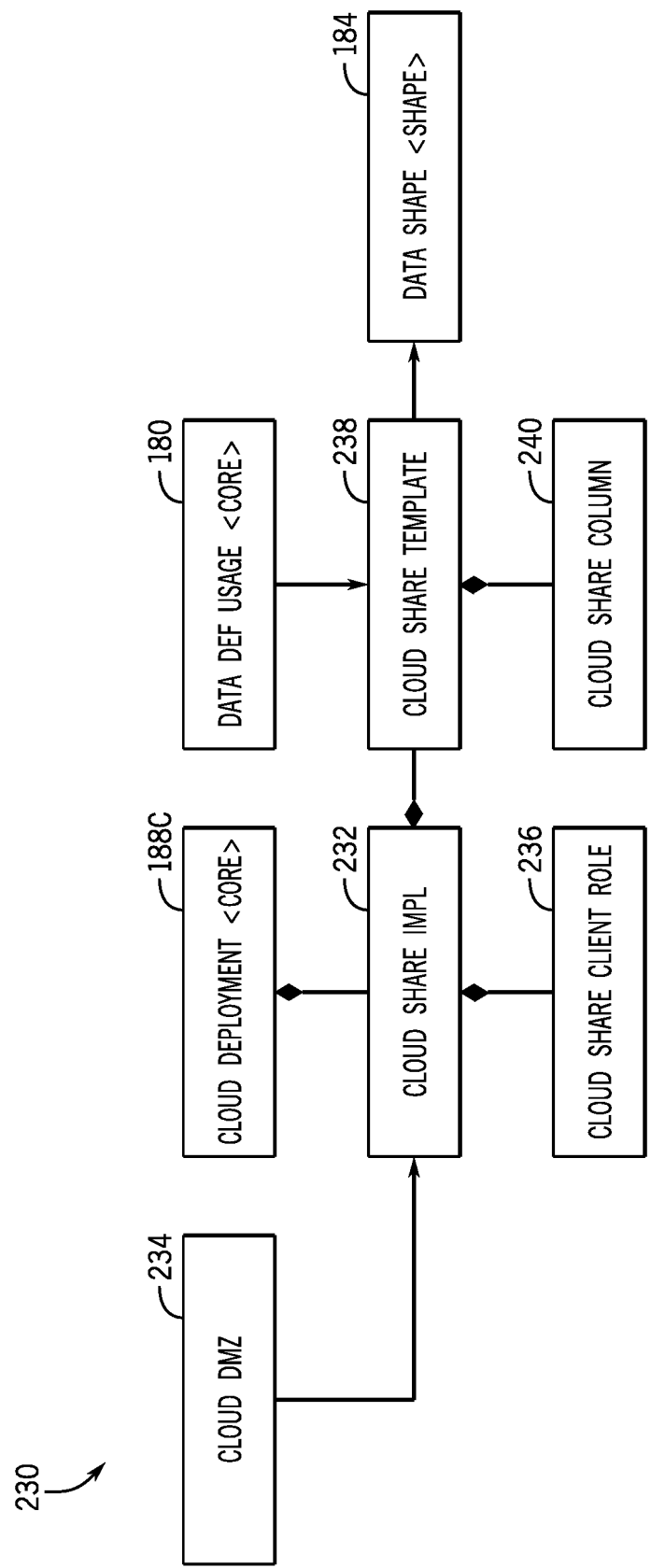
FIG. 9 is a block diagram of a model of one of the deployments of FIG. 7, in accordance with one or more current embodiments.

FIG. 9 illustrates a model 230 of the deployment 188C of FIG. 7. The deployment 188C may have a share implementation 232, which may enable specific data (e.g., based on the requesting party) to be accessed. In particular, the share implementation 232 may include data regarding data definitions and which parties may access the data. In this manner, particular data may ultimately be shared with users or requesters that are permitted to access the particular data. For example, the share implementation 232 may utilize access data 234 that defines the appropriate level of access that each client or party may have to stored data. The access data 234 may also be utilized to provide each client or requester a unique access point to stored data while preventing other clients and requesters from being able to observe or become aware that the client or requester can access the data through the unique access point. Additionally, the share implementation 232 may utilize a client role 236 that defines the role of a particular client or party that requests data. The share implementation 232 may also utilize a share template 238, which may define the physical storage location (e.g., a particular location in a column of columns 240 of a data table) of the data definition usage 180. In this manner, data definitions to be included in, or usable by, the deployment 188C are defined to enable clients or requesters to perform particular searches or queries for data.

Figure 10:
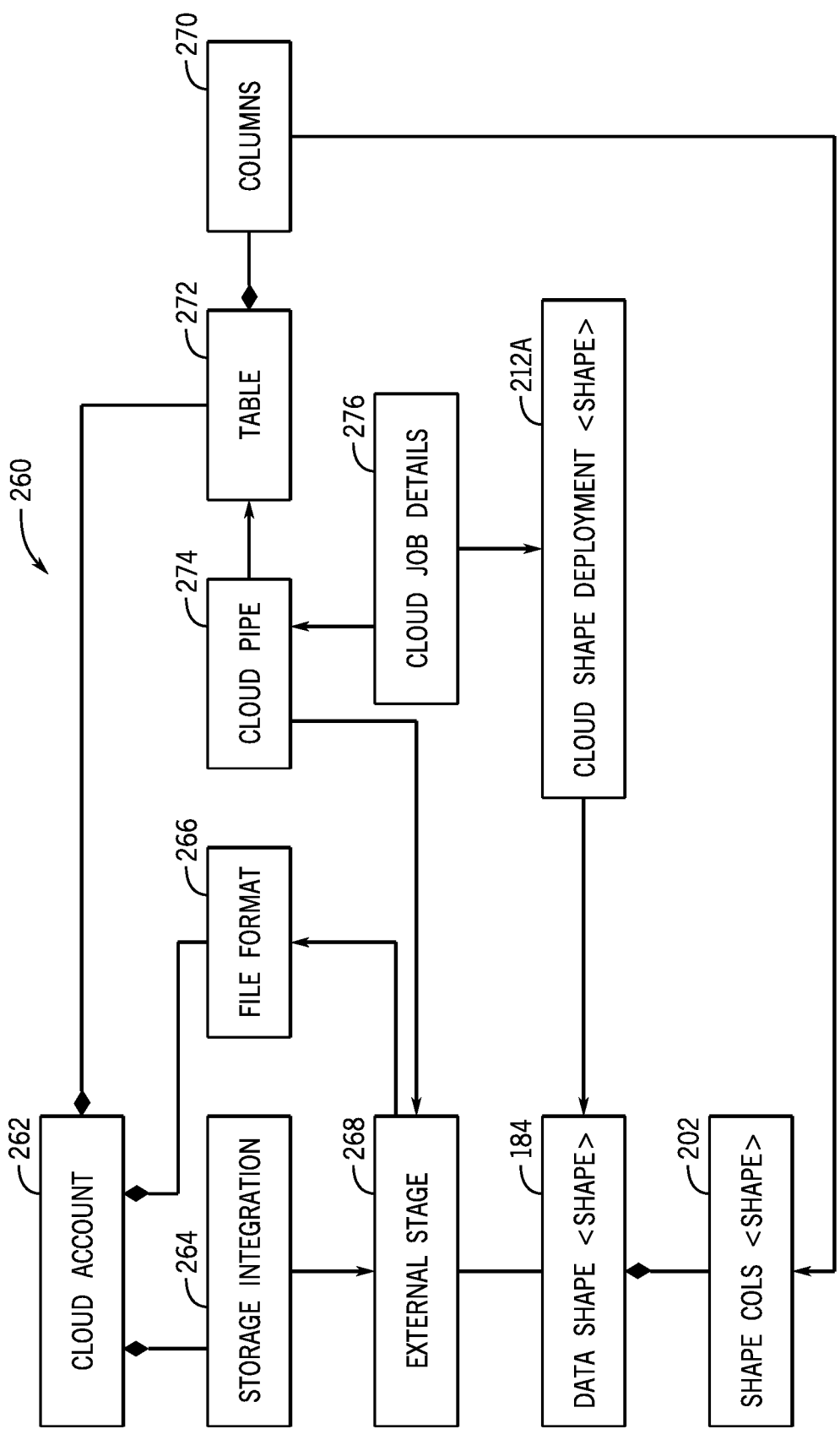
FIG. 10 is a block diagram of a model of a physical implementation for an account that may access data from a database, in accordance with one or more current embodiments.

FIG. 10 is a model 260 of a physical implementation for an account 262 that may be utilized with a particular platform. The account 262 may utilize a storage integration 264, which may define permissions associated with the account 262, and a file format object 266, which may define which file format(s) are to be utilized with the account. The storage integration 264 may generate or utilize an external stage 268 that defines permissions used to reference data shapes 184, including data that may be associated with the data shape 184 (e.g., columns 202, that may be generated from columns 270). The account 262 may also be generated based on a table 272, which may define where data (e.g., to be accessed by the account 262 or that is accessible by the account 262) is stored. In other words, the table 272 may define physical memory locations for data, which may be included in the columns 270 of the table 272. The model 260 may also utilize a pipeline 274, which may pull data from other platforms. In other words, the pipeline 274 may ingest data from another platform and populate the table 272 with the ingested data. The pipeline 274 may utilize job details 276 to do so. In particular, the job details 276 may define processes or other information related to data processing or queries. As such, the job details 276 may define or be indicative of which data the pipeline 274 is to retrieve from another platform or other platforms.

Figure 11:
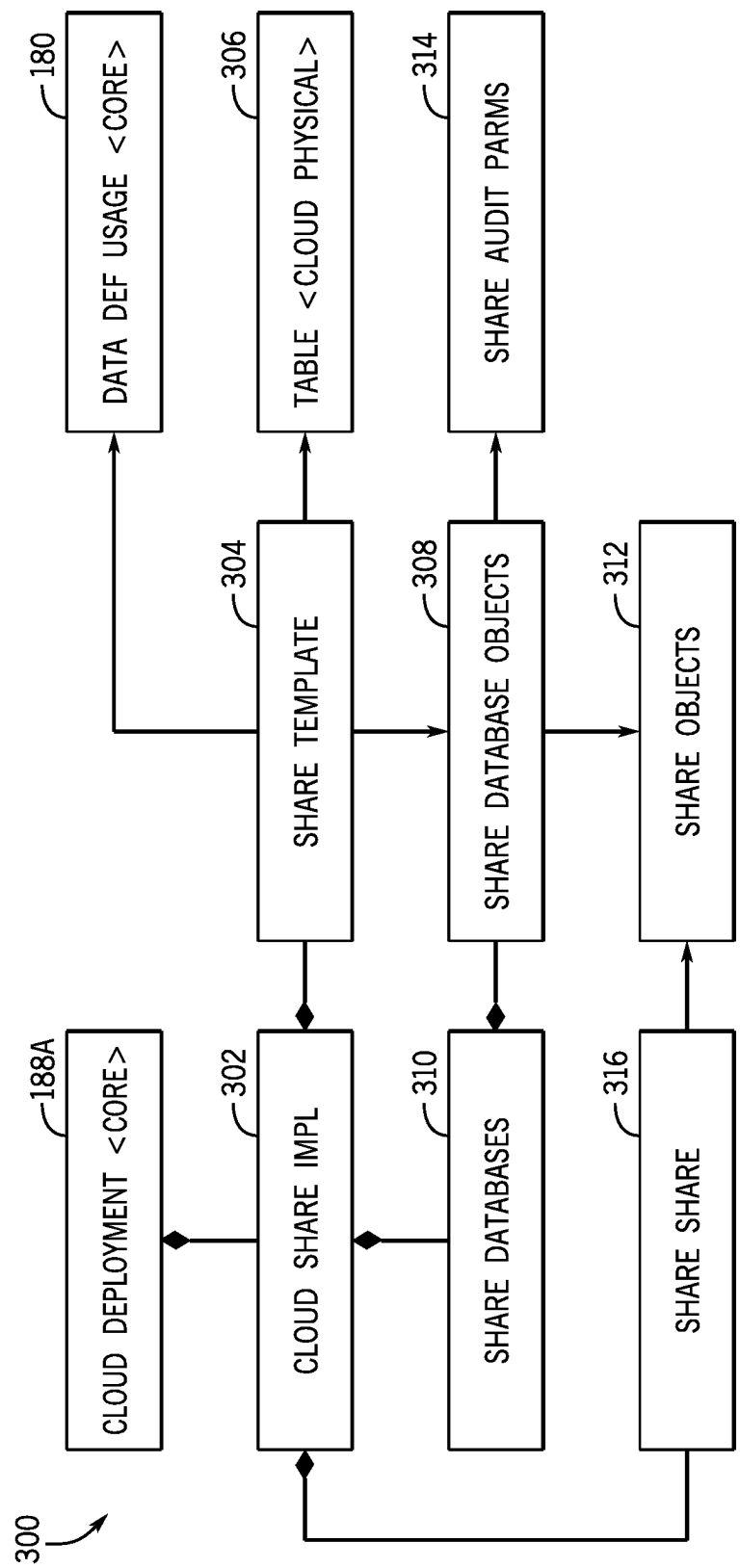
FIG. 11 is a block diagram of model of another of the deployments of FIG. 7, in accordance with one or more current embodiments.

FIG. 11 is a model 300 of the deployment 188A of FIG. 7. The deployment 188A may have a share implementation 302, which may enable specific data (e.g., based on the requesting party) to be accessed. In particular, the share implementation 302 may include data regarding data definitions and which parties may access the data. In this manner, particular data may ultimately be shared with users or requesters that are permitted to access the particular data. The share implementation 302 may utilize a share template 304, which may connect the share implementation to a physical storage location (e.g., a particular location in a data table 306) of the data definition usage 180. In this manner, data definitions to be included in, or usable by, the deployment 188A are defined to enable clients or requesters to perform particular searches or queries for data. The share template 304 may also have access to shared database objects 308 (included in a shared database 310), which may be library of objects usable in the share implementation 302. Shared objects 312 may define which of the shared database objects 308 may be utilized or accessible. In other words, the shared objects 312 may restrict access to particular objects of the shared database objects 308. Auditor 314 may determine which variables (e.g., data definitions) are used by particular data requestors or accounts and generate data (e.g., in table form) indicating accounts and the data definitions being used by the accounts. The share implementation 302 may also utilize an object sharer 316 that connects objects between accounts (e.g., from one account to an external account or multiple external accounts).

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A non-transitory computer-readable medium comprising instructions that, when executed by one or more processors, cause the one or more processors to:
   receive, from a requesting account, a selection of one or more data sets that are indicated as sharable and requestor information;
   generate a sharing request for the one or more data sets;
   validate the sharing request based on restrictions for the one or more data sets;
   apply requestor-specific restrictions to a subset of the one or more data sets to generate a modified subset of the one or more data sets, wherein the requestor-specific restrictions comprise one or more data definitions that are indicative of one or more types of data accessible by the requesting account and the one or more data definitions are included in a data shape, wherein the data shape comprises data indicative of one or more platform-specific deployments for the data shape; and
   send the modified subset of the one or more data sets to the requesting account.

2. The non-transitory computer-readable medium of claim 1, wherein the instructions, when executed, cause the one or more processors to determine the restrictions and the requestor-specific restrictions for the one or more data sets based on the requestor information.

3. The non-transitory computer-readable medium of claim 1, wherein the instructions, when executed, cause the one or more processors to apply the requestor-specific restrictions to the subset of the one or more data sets as part of an extract, transmit, and load (ETL) process for retrieving data from a cloud computing system or database.

4. The non-transitory computer-readable medium of claim 1, wherein the subset of the one or more data sets comprises personally identifiable information (PII), and the subset, as restricted by the requestor-specific restrictions, is void of the PII.

5. The non-transitory computer-readable medium of claim 1, wherein the requestor-specific restrictions comprise an indication of whether the requesting account has read-access permission to the subset of the one or more data sets, write-access permission to the subset of the one or more data sets, or both the read-access permission and the write-access permission to the subset of the one or more data sets.

6. The non-transitory computer-readable medium of claim 1, wherein the one or more data definitions comprise one or more runtime variables utilized to generate the modified subset from the subset of the one or more data sets.

7. The non-transitory computer-readable medium of claim 1, wherein:
   the subset of the one or more data sets comprises data for a plurality of accounts;
   the plurality of accounts comprises the requesting account; and
   the modified subset is generated by removing, from the subset of the one or more data sets, data associated with any account of the plurality of accounts other than the requesting account.

8. The non-transitory computer-readable medium of claim 1, wherein the one or more types of data comprise advertisement impressions, and the modified subset of the subset of the one or more data sets comprises a value indicative of number of advertisement impressions associated with the requesting account.

9. The non-transitory computer-readable medium of claim 1, wherein the one or more platform-specific deployments correspond to unique deployments for the data shape for different cloud-computing services.

10. A computer-implemented method, comprising:
    receiving, via one or more processors, a selection of one or more data sets that are indicated as sharable from a requesting account and requestor information;
    generating, via the one or more processors, a sharing request for the one or more data sets;
    validating, via the one or more processors, the sharing request based on determining restrictions for the one or more data sets based on the requestor information, wherein validating the sharing request comprises matching parameters of the sharing request with one or more ETL processes for generating conformed data tables;
    applying, via the one or more processors, requestor-specific restrictions to a subset of the one or more data sets as part of an extract, transform, load (ETL) data process to generate a modified subset of the one or more data sets; and
    sending, via one or more processors, the modified subset of the one or more data sets to the requesting account.

11. The computer-implemented method of claim 10, wherein the requestor-specific restrictions comprise one or more data definitions that are indicative of one or more types of data accessible by the requesting account.

12. The computer-implemented method of claim 10, wherein:
    the subset of the one or more data sets comprises data for a plurality of accounts;
    the plurality of accounts comprises the requesting account; and
    the modified subset is generated by removing, from the subset of the one or more data sets, data associated with any account of the plurality of accounts other than the requesting account.

13. A computer-implemented method, comprising:
    receiving, via one or more processors, a selection of one or more data sets that are indicated as sharable from a requesting account and requestor information;
    generating, via the one or more processors, a sharing request for the one or more data sets;
    validating, via the one or more processors, the sharing request based on determining restrictions for the one or more data sets based on the requestor information;
    applying, via the one or more processors, requestor-specific restrictions to a subset of the one or more data sets as part of an extract, transform, load (ETL) data process and merging, via the one or more processors, one or more additional data sets associated with the requesting account with the subset of one or more data sets to generate a modified subset of the one or more data sets; and sending, via one or more processors, the modified subset of the one or more data sets to the requesting account.

14. A system, comprising:

one or more processors; and a non-transitory computer readable medium comprising instructions that, when executed by the one or more processors, cause the one or more processors to:

receive, from a requesting account, a selection of one or more data sets that are indicated as sharable and requestor information;

generate a sharing request for the one or more data sets;

validate the sharing request based on restrictions for the one or more data sets;

apply requestor-specific restrictions to and remove non-printable characters from a subset of the one or more data sets to generate a modified subset of the one or more data sets; and send the modified subset of the one or more data sets to the requesting account.

15. The system of claim 14, wherein:

the requestor-specific restrictions comprise one or more data definitions that are indicative of one or more types of data accessible by the requesting account;

the one or more types of data comprise advertisement impressions; and the modified subset of the subset of the one or more data sets comprises a value indicative of number of advertisement impressions associated with the requesting account.

16. The system of claim 15, wherein:

the one or more data definitions comprise a runtime variable indicative of a particular advertisement campaign; and the number of advertisement impressions is specific to the particular advertisement campaign.

* * * * *